(Model.)
L. G. BALLINGER.
VEHICLE TIRE COUPLER.
No. 367,581. Patented Aug. 2, 1887.
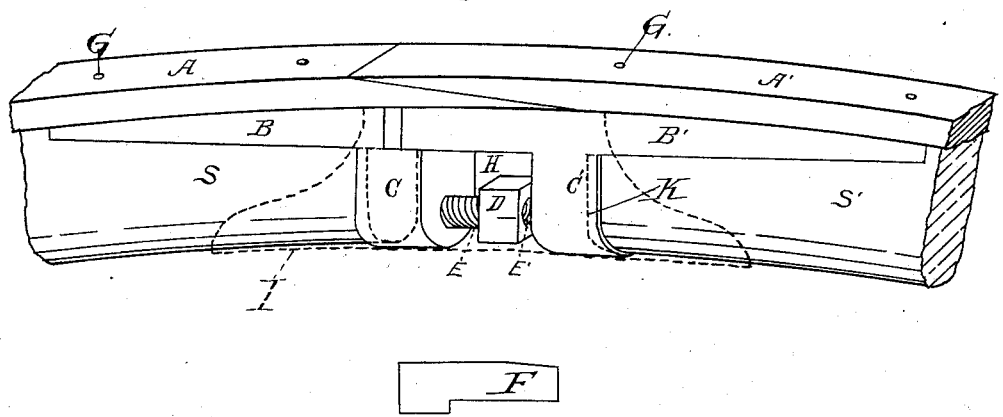
Attest.
W. U. Campbell
A. G. Stewart
Inventor.
Levi G. Ballinger.
W. D. Campbell, atty.

United States Patent Office.

LEVI G. BALLINGER, OF EAST LIBERTY, OHIO.

VEHICLE-TIRE COUPLER.

SPECIFICATION forming part of Letters Patent No. 367,581, dated August 2, 1887.

Application filed September 27, 1886. Serial No. 214,663. (Model.)

*To all whom it may concern:*

Be it known that I, LEVI G. BALLINGER, a citizen of the United States, and a resident of East Liberty, in the county of Logan and State of Ohio, have invented a new and useful Coupler for Vehicle-Wheels, of which the following is a specification.

My invention relates to improved means of tightening the tire on vehicle-wheels and preventing the rattling of wheels caused by shrinkage in dry weather.

In the drawings, Figure 1 is a perspective of the device, and Fig. 2 is a detail.

A A' is my tire; B B', tire-coupler; C C', shoulders on the coupler; D, right and left handed screw working to draw the shoulders or lugs C C' together; E, right-handed threads; E', left-handed threads; F, wedge or cap that keeps the screw D from turning and also forms a solid bearing between the upper part of the coupler and the screw; G, bolts or rivets that fasten the tire to the parts of the coupler; I, shield or screen to cover the coupler when applied; K, sockets in shoulders C to receive the ends of the fellies.

The construction and operation of my device are as follows: Instead of welding my tire together, heating it to put it on the fellies, and then shrinking it and bolting it tight, as is commonly done, I bolt my tire to the fellies, leaving the ends of the tire which are beveled loose, one overlapping the other. The fellies do not reach clear around the wheel, but have attached to their two ends, which are a couple of inches apart, the coupler B B', the two parts of which are joined by the right and left handed screw D, passing through the lugs or shoulders C C' on the parts B B'. The part B' overlaps and rests on the shoulders C, but does not quite meet the part B.

The tire A is bolted fast to the fellies and also to the part B of the coupler. The end A' of the tire is bolted fast to the fellies and to the part B' of the coupler, and also overlaps and rests on the end A, both ends being beveled. The screw D is kept from turning by the key F, placed above it, which key fits in a seat provided for it, and it also serves to form a solid bearing between the part B' of the coupler and the screw.

The ends of the fellies are inserted in a socket, K, in the shoulders C C' on the coupler B B'. One end of the tire is bolted or riveted fast to the part B, and the other end, A', which overlaps the end A, is bolted fast to the part B' of the coupler. The screw D, which has the right and left handed screw-threads thereon fitting corresponding threads in the holes in the shoulders C C', is turned, drawing the parts up tight until the fellies and coupler B B' make a solid ring, drawn tightly at all points. The key F is then inserted above the screw D to prevent its turning and to form a solid bearing for it against the parts B'. The cap I is then secured to the fellies, so as to cover the coupler B B', when the wheel is ready for use.

Should the fellies shrink, causing the tire to become loose and rattle, the cap is removed and the screw turned until everything is taken up tight again.

The coupler reaches across the space between two spokes.

What I claim is—

The combination, with the coupling-pieces B B', attached to the ends of the tire and the fellies, of the screw D and key F, as and for the purpose set forth.

LEVI G. BALLINGER.

Witnesses:
C. D. CAMPBELL,
E. K. CAMPBELL.